(12) United States Patent
Büermann et al.

(10) Patent No.: US 6,688,971 B2
(45) Date of Patent: Feb. 10, 2004

(54) CHOPPER ARRANGEMENT

(75) Inventors: Martin Büermann, Haunsheim (DE); Walter Hirsch, Kirkel/Limbach (DE); Adolf Belter, Dresden (DE); Gerd Bernhardt, Bannewitz/Hänichen (DE); Siegfried Firus, Dresden (DE); André Heinrich, Löbau (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/005,617

(22) Filed: Dec. 6, 2001

(65) Prior Publication Data

US 2002/0073675 A1 Jun. 20, 2002

(30) Foreign Application Priority Data

Dec. 20, 2000 (DE) .......................................... 100 63 554

(51) Int. Cl.$^7$ ................................................ B02C 21/02
(52) U.S. Cl. ....................................... 460/112; 460/901
(58) Field of Search ................................. 460/112, 111, 460/901; 56/60

(56) References Cited

U.S. PATENT DOCUMENTS

| 761,441 A | * | 5/1904 | Brooks | ........................... 56/60 |
| 2,231,185 A | * | 2/1941 | Gisriel | ........................ 241/93 |

FOREIGN PATENT DOCUMENTS

| BE | 526 170 | 7/1956 |
| DE | 577 081 | 5/1933 |
| DE | 962 213 | 4/1957 |
| DE | 1 009 844 | 6/1957 |
| DE | 33 24 467 A1 | 1/1985 |
| DE | 43 21 905 A1 | 1/1995 |
| DE | 44 31 802 A1 | 3/1996 |
| DE | 197 53 486 A1 | 6/1999 |
| DE | 200 10 221 U1 | 10/2000 |
| EP | 0 164 489 | 12/1985 |
| EP | 0 631 717 A1 | 1/1995 |
| FR | 2 586 525 | 3/1987 |
| GB | 1 534 800 | 3/1976 |

OTHER PUBLICATIONS

U.S. patent 6,070,816; application No. 09/201,108; Filed Nov. 30, 1998.

* cited by examiner

*Primary Examiner*—Robert E. Pezzuto
*Assistant Examiner*—Meredith Petravick

(57) ABSTRACT

A chopper arrangement for a harvesting machine comprises a body that is rotated in a predominantly vertical axis of rotation. The body is provided with a plurality of radially extending knives that are axially distributed along the body. The knives have radially outer ends that are arranged in a conical shape. In this way the knives at the first end having a smallest radial extension are rotated at a slower circumferential speed than knives having a larger radial extension.

7 Claims, 5 Drawing Sheets

CHOPPER ARRANGEMENT

FIELD OF THE INVENTION

The invention is directed to a chopper arrangement having several knives, that are fastened to a rotating vertical body, so that the uppermost blades located at the inlet have a slower circumferential speed than the lowermost blades.

BACKGROUND OF THE INVENTION

DE 43 21 905 A discloses an attachment chopper for a combine. The chopper comprises a straw chopper having a horizontal axis of rotation which conducts the chopped crop material by transfer funnels to ejector blowers. The ejector blowers have vertical axes of rotation and eject the chopped crop material onto a field.

DE 44 31 802 A discloses an attachment chopper with which the straw is conducted by a horizontal screw conveyor to a vertically arranged chopper which chops the straw and simultaneously conveys it. The chopped straw leaves the rotor housing through ejection ducts attached thereto, that can be pivoted about a vertical axis.

DE 197 53 486 A discloses a chopper arrangement that is also provided with a cylindrical chopper rotor for the chopping and ejection of the crop, which rotates about a vertical axis of rotation. The crop is supplied to the chopper rotor tangentially.

One advantage for the use of chopper rotors with vertical axes of rotation lies in the fact that the kinetic energy transmitted by the chopper rotor to the chopped crop can be used for the ejection and sideways distribution of the chopped crop on the field. However, an axial supply of the chopped crop is problematical in the relatively narrow gap between the rotor and the housing. In the chopper arrangement of DE 197 53 486 A an axial supply is used, whereas with attached choppers of DE 44 31 802 A a screw conveyor is required.

SUMMARY OF THE INVENTION

It is an object of the present invention to provide a chopper arrangement with high ejection trajectory of the chopped crop having improved supply characteristics.

It is proposed that the knives be fastened to a central body that can be brought into rotation by a drive. The knives are positioned on the body in such a way that the radially outer ends of the knives are spaced at different radial distances from the axis of rotation of the body as a function of their axial position on the body. The radially outer ends of the knives are thereby arranged in the form of a cone over at least one partial region of the length of the body. The radially outer end of a knife arranged, for example, at a first end of the body is thereby relatively close to the axis of rotation. The knives following in the axial direction are located at a greater distance from the axis of rotation. In this way the circumferential velocity of the knives increases, the farther the particular knife is located away from the first end of the body. The crop material to be chopped is supplied to the first end of the body axially, tangentially or radially. The crop material is taken up relatively slowly and during its movement over the length of the chopper arrangement is accelerated by the knives. The knives may be suspended on the body rigidly or pendulously and may interact with shear bars attached to the housing.

The arrangement of the knives according to the invention results in improved supply characteristics of the chopper arrangement, since the chopped crop does not experience any great changes in velocity during its introduction into the chopper arrangement. If the chopper arrangement is applied to a combine with an axial supply, a discharge beater can be omitted between the straw shakers or the separating rotors and the chopper arrangement. However, it is also conceivable that a conveying element of this type may be configured, for example, as belt conveyor, conveyor roll, pair of conveyor rolls or a screw conveyor that guides the chopped crop together from the sides.

If the radially outer ends of the knives are arranged in the form of a cone, the ends of the knives are at a greater distance from the axis of rotation the further each of the knives is spaced axially from the first end of the body. The result is a continuous acceleration of the chopped crop on its path along the axial length of the body.

A conical arrangement of the ends of the knives or one varying in another way, can basically be attained in three ways. In one way, knives of varying length are fastened to a cylindrical body. The length of the knives is varied as they are distributed in the axial direction along the length of the cylindrical body, increasing successively. In another way, the knives are fastened to retainers of varying length that extend from the cylindrical body. The length of the retainers is varied as they are distributed in the axial direction along the length of the cylindrical body, increasing successively. The knife retainers may be configured in a blade shape in order to generate a flow of air through the chopper. Alternatively, uniformly sized knives can be fastened to a conical body. Uniform knives and are preferred as it reduces the number of different parts and for reasons of cost. In the case of a conical body, a further advantage is seen in the fact that less chopped crop can accumulate between the outer ends of the knives and the body, since the knives can be dimensioned to be shorter.

The axis of rotation of the body is predominantly vertical and may be inclined relative to the horizontal. The result of this is that the crop is ejected horizontally and is distributed homogeneously in a sideways direction on a field, without the need for (an energy-wasting) deflection of the flow of the chopped crop.

The large components of the crop to be chopped is preferably supplied at the end of the cone having the smaller dimension. It can be supplied axially, radially or tangentially. In particular, the material can be introduced into the gap between the circular envelope described by the rotating body and the housing, where a considerable portion of the length of the body equipped with knives (or the entire length) can accept the crop coming from the sideways direction.

In particular, in the case of an axial supply of the material to be chopped, cutting elements arranged at the inlet end of the body can improve their acceptance of the material, in that they mill down the incoming mat of the crop.

In a preferred embodiment, the housing of the chopper arrangement is equipped with one or more tube-shaped ejection ducts, through which the chopped crop is ejected. As a rule, the ejection duct or ducts are adjacent to the end of the cone that has the greater radial dimension. Alternatively, the height of the ejection duct may extend over the entire height of the body with the knives attached thereto. The body and the attached knives can generate a tangential airflow directed at the ejection duct that improves the ejection of the chopped material.

The ejection duct can be pivoted about a vertical axis in order to eject the chopped material in successively different directions. The pivoting movement can be continuous, in order to distribute the chopped crop over the width of the swath taken up by the combine harvesting assembly. It is also conceivable to pivot the direction or directions of ejection on the basis of the wind direction, the inclination of the terrain, or stop at a fixed position on the basis of measured conditions or conditions provided as input by an operator.

In the case that the capacity of a chopper arrangement with one body and the attached knives should not be sufficient, an obvious solution would be to arrange two bodies sideways alongside each other. Their axes of rotation can extend parallel or inclined to each other. Here it is conceivable that the bodies be installed in a common housing, or to use two separate housings.

It is appropriate if the knives are arranged on the body in a helical pattern, that is azimuthal in the direction of rotation and axially offset helically to each other, so that they improve the conveying of the chopped crop in the axial direction.

In a preferred embodiment, a blower is located adjacent to the end of the cone with larger radial dimensions. The latter is equipped with blades that rotate about the same axis as the knives. The blower accelerates the chopped crop and improves the ejection. It is conceivable, that instead of a separate blower, or in addition to it, ejector blades be attached to the larger end of the cone. Their length and/or position can be variable which can be attained by appropriate repositioning arrangements controlled manually, remotely or automatically by a control arrangement. In this embodiment the chopped crop can also be ejected through pivoted or stationary ejection ducts, that are adjacent to the blower or the ejector blades.

The blades can be driven by a gearbox inserted between the body and the blower, so that the body and the blower can rotate at different rotational speeds. Furthermore, the blades of the blower can be equipped at their outer ends with knives, that preferably interact with shear bars attached to the housing. This results in an improvement in the chopping effect.

In addition, the blower can generate an air flow in the axial direction so that chopped crop is already drawn into the inlet of the housing of the chopper arrangement and is conveyed in axial direction through the chopper arrangement. The shape of the knives fastened to the body can also be selected in such a way that they generate an axial airflow.

Furthermore, it is proposed that an intake helix be arranged on the inlet end of the body that improves the intake characteristics of the chopped crop. Intake helixes of this kind are known in themselves, for example, from axial separator rotors.

The housing of the chopper arrangement preferably conforms at least partially to the shape of the cone, so that the chopped crop passes through a gap of approximately constant dimension between the housing and the knives and is chopped there. On the interior side of the housing guide vanes may be attached that guide chopped crop and air in axial or helical direction.

DETAILED DESCRIPTION

Figure 1:
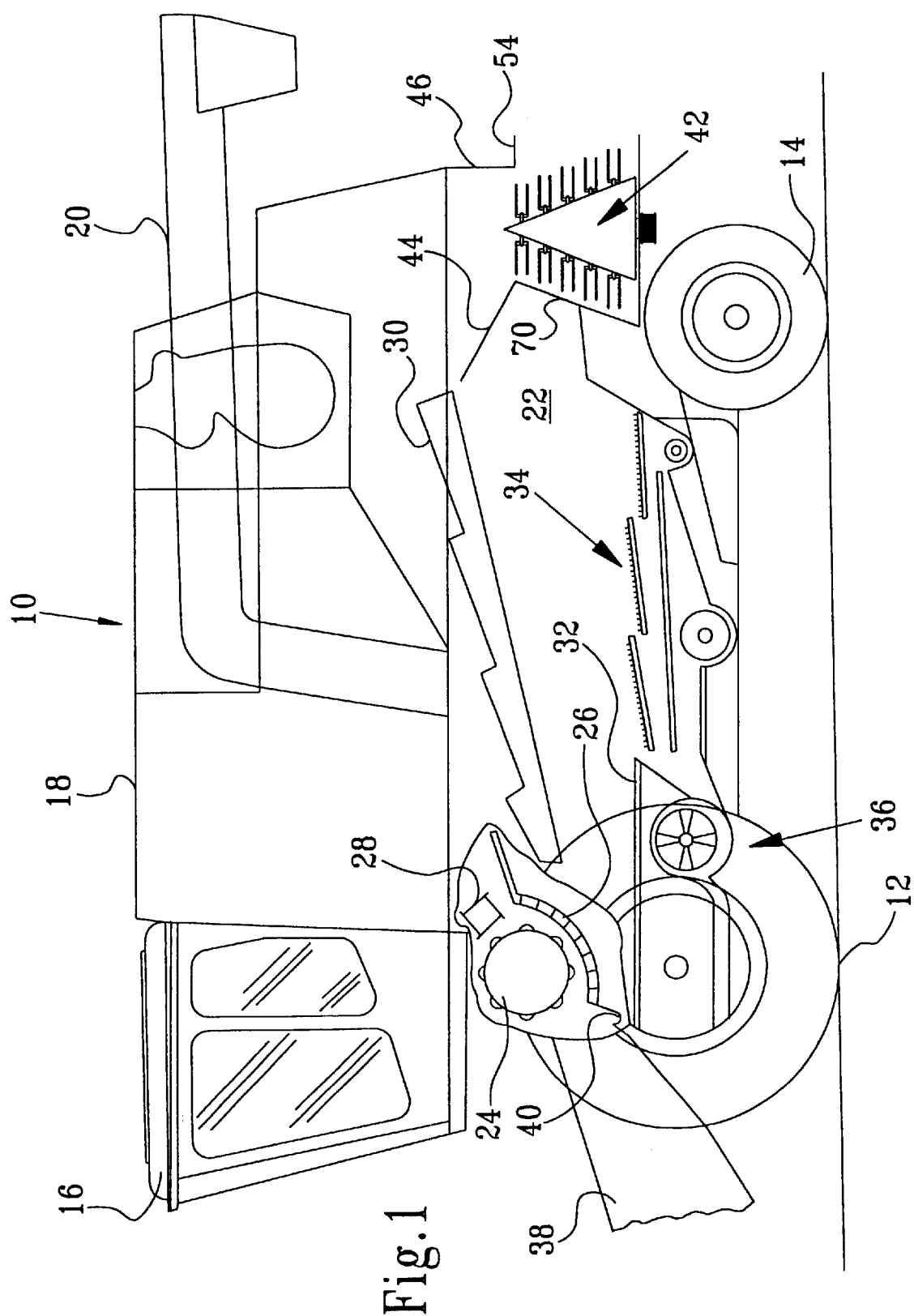
FIG. 1 is a semi-schematic side view of a harvesting machine with a first embodiment of a chopper arrangement.

A harvesting machine 10 shown in FIG. 1 in the form of a combine is supported on front driven and rear steerable wheels 12 and 14, respectively, and is provided with an operator's cab 16 from which it can be controlled by an operator. A grain tank 18 is located behind the operator's cab 16. The grain tank 18 is provided with an unloading auger 20 through which clean grain from the grain tank can be transferred to an awaiting grain cart or truck. The grain tank 18 is supported on a frame 22 formed by left and right side sheets. Harvested crop material is directed from a harvesting assembly, not shown, by the feeder house 38 past stone trap 40 into the interior of the combine formed by the left and right side sheets. The interior of the combine is provided with a threshing assembly, a separating assembly and a cleaning assembly. The threshing assembly separates the harvested crop material into its large and small components. The threshing assembly comprises a threshing cylinder 24, a concave 26, and a beater 28. Large components having small components, like grain, entrained therein are directed by the threshing assembly to the separating assembly. The separating assembly releases the trapped grain from the large components. In the illustrated embodiment the separating assembly comprises straw walkers 30. The small components, such as grain and chaff, fall onto grain pan 32 from the concave 26 and from straw walkers 30. The grain pan 32 directs the small components to the cleaning assembly. The cleaning assembly comprises sieves 34 and blower 36. Chaff is blown out the rear of the combine by the blower 36, whereas clean grain is collected on the floor of the combine where it is collected and directed to the grain tank 18 by a clean grain elevator, not shown. The large crop components are conducted over the straw walkers 30 and a straw guide vane 44 to a chopper arrangement 42 located beneath a straw exhaust hood 46. It would also be conceivable to conduct the chaff to the chopper arrangement 42 in order to distribute them over a wide region on the ground of the field. Although the present invention is described as being used with a combine having a separating assembly comprising straw walkers, this invention could also be used on combines having rotary separating assemblies.

The chopper arrangement 42 can be fastened to the harvesting machine 10 so that it can be pivoted or slid into a non-operating position to deposit the large components in a windrow or for maintenance purposes.

Figure 2:
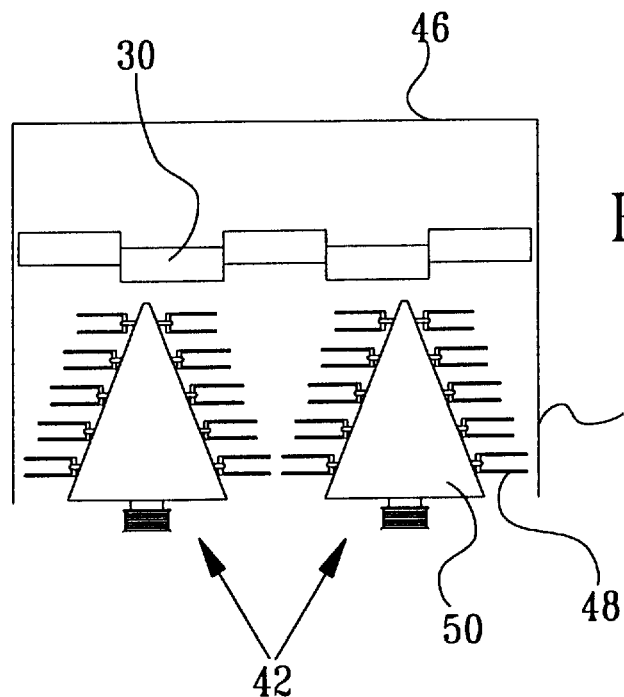
FIG. 2 is a rear view of the chopper arrangement of FIG. 1.

The first embodiment of the subject chopper arrangement 42 is illustrated in FIG. 2 as a rear view. It includes two rotors, each of which comprise a central conical body 50 having pendulously support knives 48 mounted in bearings thereon, and a housing 70 enclosing the rotors. The knives 48 are arranged in pairs, each arranged one above the other. The bodies 50 can rotate about a vertical axis that corresponds to their longitudinal axes. The first, smaller ends of the bodies 50, with the smaller radial dimensions, are arranged upward. The rotational drive of the bodies 50 is not shown in FIG. 2 but, as a rule, is arranged beneath the bodies 50. It may comprise a separate (hydraulic or electric) motor or a mechanical drive connection to the main engine of the combine 10. The lower ends of bodies 50 are rotatably supported in bearings on the housing 70. The bearing support of the bodies 50 at their upper ends is not provided in the illustrated embodiment. However, it would be conceivable, for example, to provide upper bearings in a relatively narrow strut that extends over the width of the straw exhaust hood 46, so that the flow of crop material is hindered as little as possible.

During operation, the bodies 50 are rotated and large components to be chopped are conveyed from above, in axial direction from the straw shakers 30 (or from the separating rotor or rotors of an axial combine). The conical shape of the body 50 has the effect of having lower knife circumferential speeds for the topmost knives 48 than the bottom most knives 48. So that the circumferential speed of the topmost knives 48 is relatively low at that location at which the large components to be chopped is received. Therefore no great change in direction or velocity takes place which would make the acceptance of the large components to be chopped by the chopper arrangement 42 more difficult. As such, the large components to be chopped are taken up without any problems. The circumferential speed of the ends of the knives 48 increases along the length bodies 50. The crop to be chopped is thereby accelerated and cut by the knives 48 that are arranged in a helical pattern on the body 50. The knives 48 interact with shear bars 52, shown in FIG. 3, fastened to the housing 70. Each shear bar 52 is located between two knives 48 of a pair.

Figure 3:
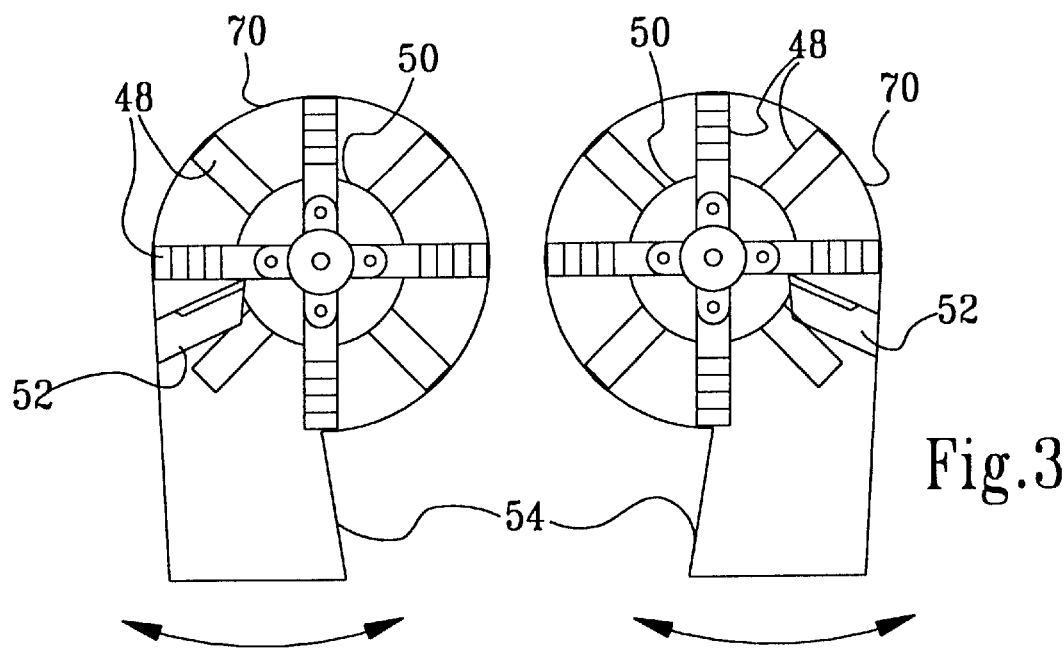
FIG. 3 is a top view of the chopper arrangement of FIG. 1.

Finally, the chopped crop is ejected through tube-shaped ejection ducts 54, provided with rectangular cross section, and is deposited on the field. As can be seen in FIG. 3 on the basis of the arrows, the ejection ducts 54 are free to pivot about vertical axes. As shown in FIG. 1, the ejection ducts 54 extend over the entire height of the bodies 50. But it would also be conceivable that they extend only over a part of the height of the bodies 50 and hence are arranged in the lower part of the bodies 50, so that the chopped crop remains longer in the chopper arrangement 42, before it is ejected. They could, for example, extend over the lower third. The two bodies 50 of FIG. 3 rotate in opposite directions.

Figure 4:
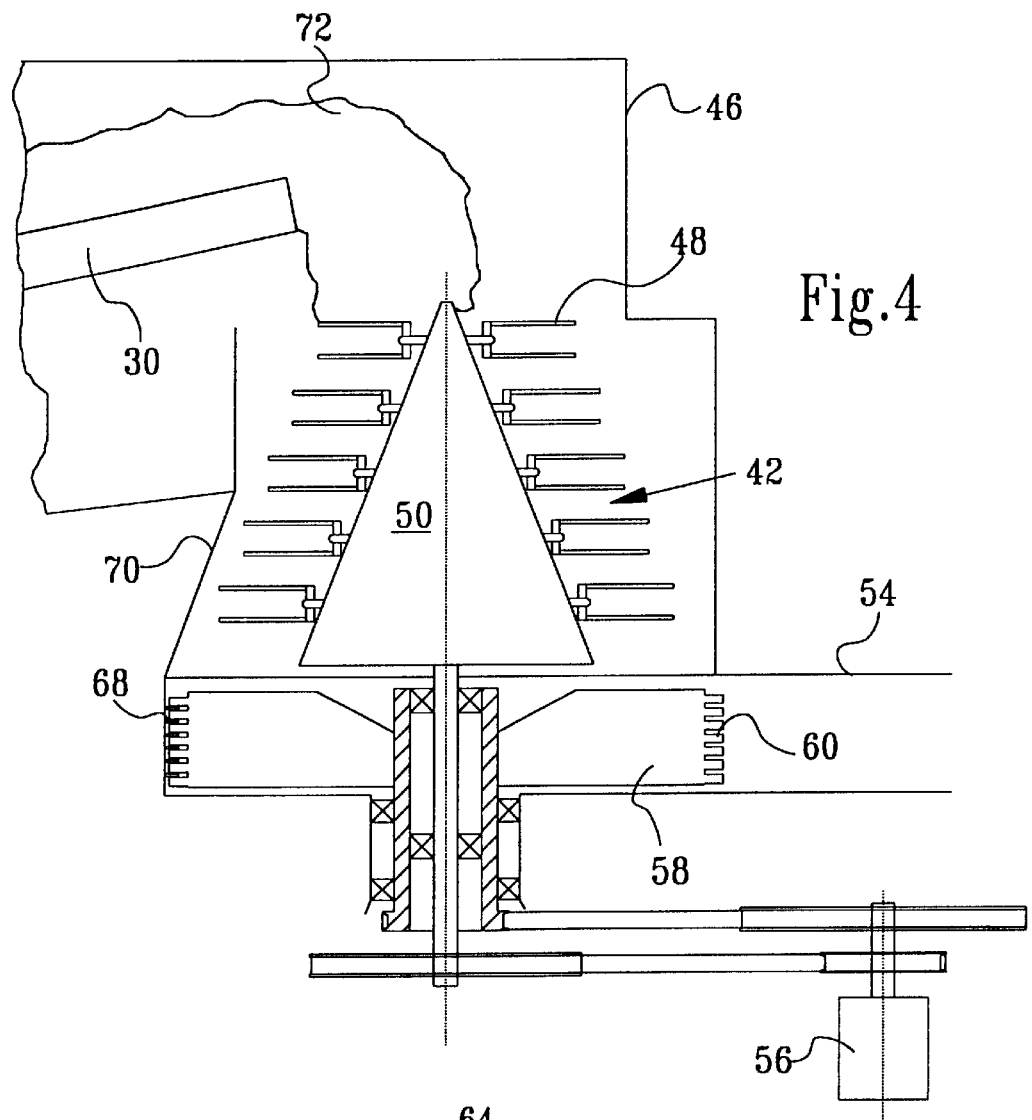
FIG. 4 is a side view of a second embodiment of a chopper arrangement.

In FIG. 4 a second embodiment of the invention is shown. The crop to be chopped 72 is supplied to the chopper arrangement 42 directly from the shakers 30 from above, without the use of a straw guide vane 44, as is shown in FIG. 1. The body 50 and the knives 48 attached to it correspond to those of the first embodiment. However, a blower having blades 58 is arranged beneath the body 50. The blades 58 are brought into rotation by a gearbox 56; they rotate about the same vertical axis about which the body 50 rotates. The body 50 is driven directly by a central shaft, while the blades 58 are brought into rotation by a hollow shaft that surrounds the central shaft and is coaxial with it. The hollow shaft is rotatably supported in bearings on the housing 70 and the central shaft is rotatably supported in bearings on the hollow shaft. The rotational speed of the blades 58 is higher than that of the body 50 in order to improve the ejection effect. The outer edge of the blades 58 are provided with knives 60 that interact with shear bars 68 of the housing 70 in order to further reduce the large components of the crop to be chopped 72. The blades 58 also convey the chopped crop 72 to the ejection duct 54. The ejection duct 54 has a rectangular cross section and can be pivoted about vertical axis. It should be noted that the blades 58 and the body 50 may be driven at the same rotational speed.

Figure 5:
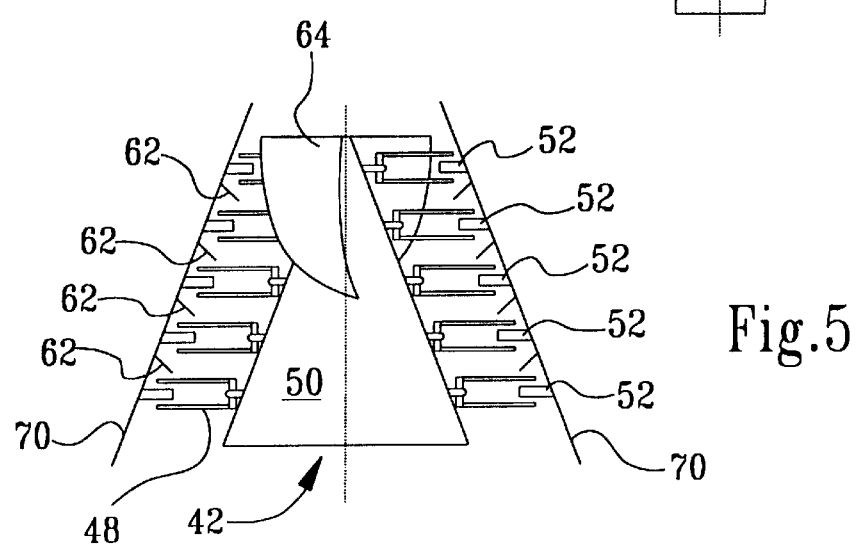
FIG. 5 is a side view of a third embodiment of a chopper arrangement.

A third embodiment of the invention is finally shown in FIG. 5. The chopper arrangement 42 in its basic configuration coincides with that shown in FIGS. 1 through 3. Helical flights 64 are attached to the upper side of the body 50 of the chopper arrangement 42. The helical flights 64 draw the large components of the crop to be chopped into the chopper arrangement 42. The helical flights 64 are a sheet metal component bent into a screw-shaped configuration with a diameter that widens upward. It would also be conceivable to shape the intake helix 64 so as to narrow in the upward direction.

Further differences to the forgoing embodiments include guide vanes 62 that are arranged on the interior wall of the housing 70. The guide vanes 62 guide the large components of crop material to be chopped and air along a helical path from the inlet on the upper side through the housing 70 to the outlet, that is not shown in FIG. 5. The outlet may be configured in the form of an ejection duct 54, as was illustrated in FIGS. 1 and 4.

Figure 6:
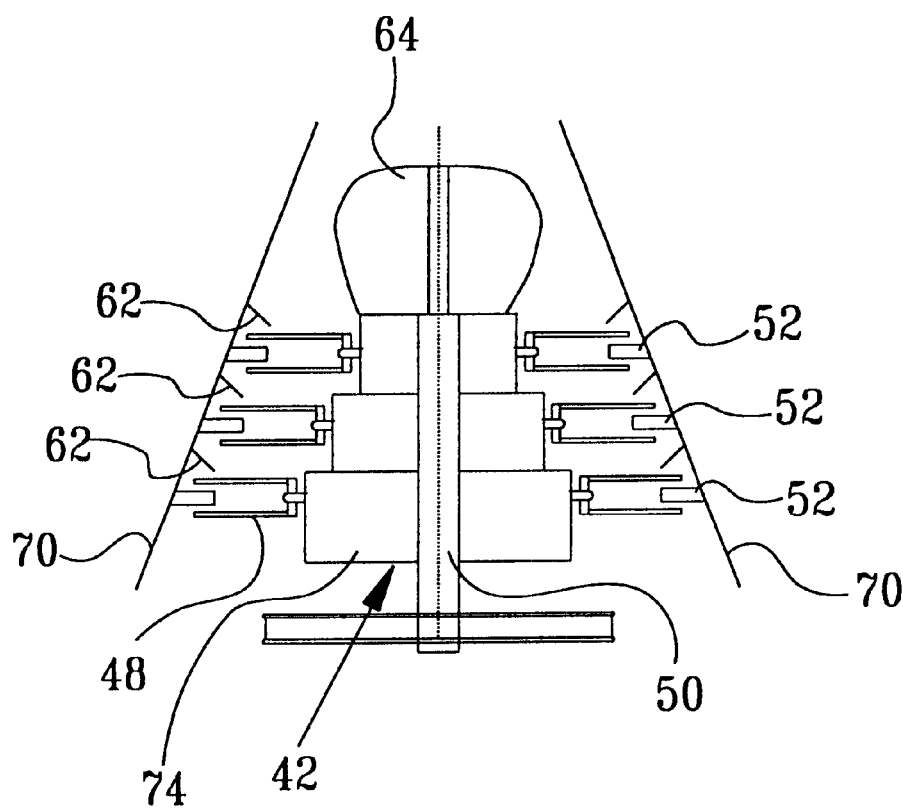
FIG. 6 is a side view of a fourth embodiment of a chopper arrangement.

FIG. 6 shows a fourth embodiment of a chopper arrangement according to the invention. The body 50 is not configured as a cone, but as a cylinder having a series of radially extending blades 74. The radially extending blades 74 are arranged one above one another. The knives 48 are suspended pendulously on the outer edges of the blades 74. The radial length of the blades 74 changes in steps the higher each blade 74 is attached to the body 50. It is also conceivable that the blades 74 may be arranged at an angle to the axis of rotation of the body 50, in order to generate or to strengthen a downward airflow through the chopper arrangement. Blades 74 that are arranged one above the other may be offset in azimuthal direction. The intake helix 64 is rounded at its upper outer corner and thereby does not form a pointed edge, as is shown in FIG. 5.

Figure 7:
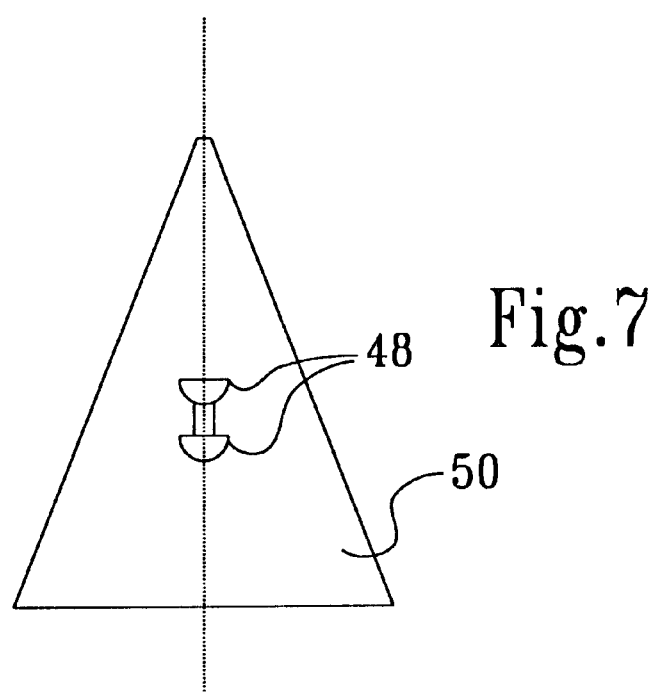
FIG. 7 is a side view of a fifth embodiment of a chopper arrangement.

FIG. 7 shows a fifth embodiment of the invention, in which the lower edges of the knives 48 are curved and the upper edges are flat. Thereby, the knives 48 are formed in the shape of an inverted airplane wing, with the result that the airflow is directed downward. Any other shape of the knives 48 is also desirable if it results in a downward directed airflow. As examples, V-shaped or curved bow-shaped knives 48 are cited, or knives 48 twisted in themselves (bent in themselves about their longitudinal axes). The knives 48 are arranged in such a way that their ground side points in the direction of the air flow. Thereby, the chopped particles are delivered by the knives 48 in the direction of the airflow.

Figure 8:
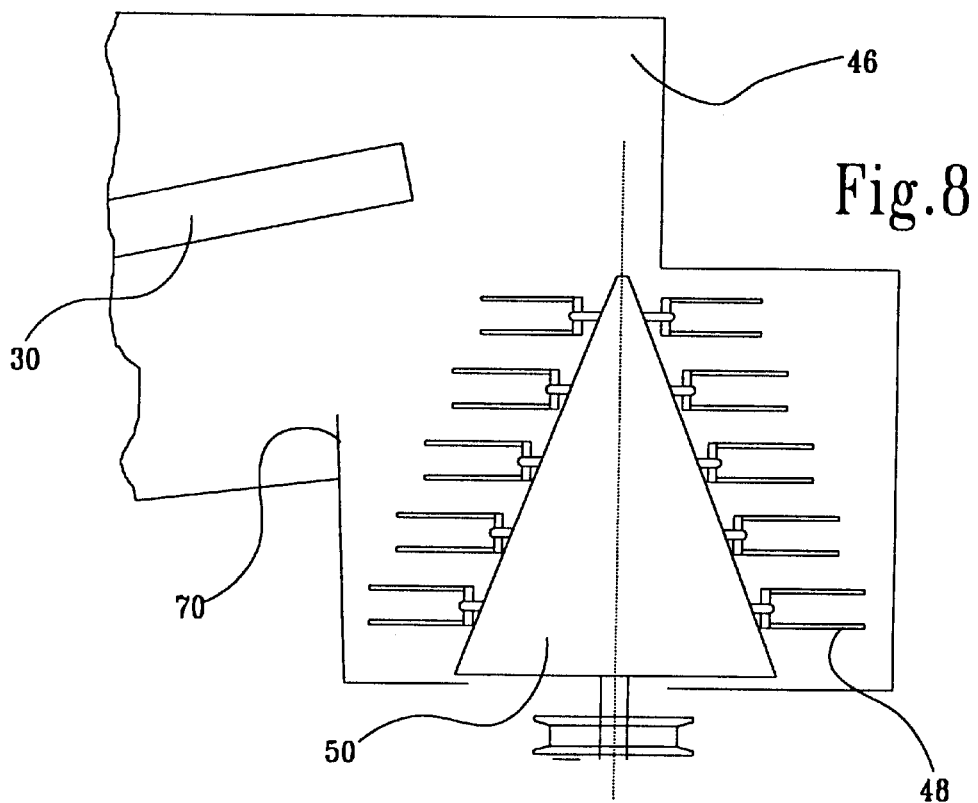
FIG. 8 is a side view of a sixth embodiment of a chopper arrangement.

FIG. 8 shows a further embodiment of the invention that generally coincides with the first embodiment that was shown in FIGS. 1 through 3. In contrast thereto, however, the front wall of the housing 70 is moved vertically upward somewhat. The gap between the housing 70 and the body 50 with the knives 48 is thereby relatively large and narrows continuously downward. In this way the material to be chopped can be drawn in without any problem. The body 50 with the knives 48 accepts the crop from the sideways direction.

Figure 9:
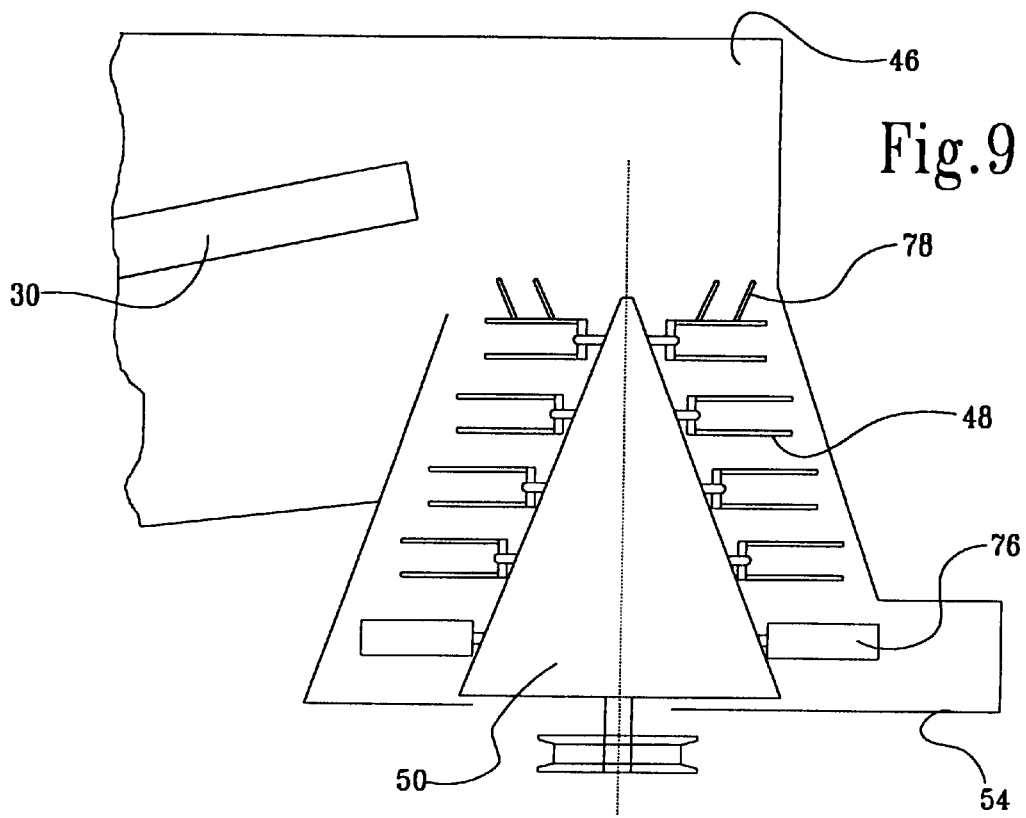
FIG. 9 is a side view of a seventh embodiment of a chopper arrangement.

Finally, a seventh embodiment of the invention is illustrated in FIG. 9. The upper part of the seventh embodiment almost coincides with the first embodiment. However, knife-like cutting elements 78 are attached to the uppermost knives 48, that are used to mill down the material supplied nearly axially and that simplify the intake of the material into the chopper arrangement. On the underside of the body 50 ejection blades 76 are attached that eject the chopped material into an adjoining ejection duct 54. Furthermore, the ejection blades 76 generate a tangential airflow, directed at the ejection duct 54.

Having described the preferred embodiments, it will become apparent that various modifications can be made without departing from the scope of the invention as defined in the accompanying claims.

What is claimed is:

1. A chopper arrangement for a harvesting machine, the chopper arrangement comprising:

two bodies that can be rotated along an axis of rotation, the two bodies are arranged sideways alongside each other, and the axes of rotation of the two bodies are substantially parallel to one another, each body extending in an axial direction and each body having a first end and a circumference, the axis of rotation of each body is predominantly vertical;

cutting elements are arranged at the first end of each body;

a plurality of knives are fastened to each body, the knives being fastened to each body so that the knives extend in the radial direction from each body and are distributed in the axial direction along each body, each of the knives having a radially outer end, the knives are arranged on each body in such a way the knives are offset axially and azimuthaly forming a helix that is directed in the direction of rotation at the end of each body opposite from the first end;

a housing houses each body and the knives, whereby the radially outer ends of the knives fastened to the first end of each body at the first end are spaced at a smaller radial distance from the axis of rotation of each body than at a second position that is spaced at an axial distance from the first end of each body the radially outer ends of the knives being arranged in the form of a cone, the housing being provided with a supply opening for receiving crop material to be chopped at the first end of each body, crop material to be chopped is supplied to the chopper arrangement between the circumference of each body and the housing, the housing being provided with an ejection duct for ejecting chopped crop material, the ejection duct being located adjacent to the end of each body opposite from the first end, the ejection duct can be pivoted about a substantially vertical axis, wherein each body, the knives and the housing are arranged to create a tangential air flow directed at the ejection duct.

2. A chopped arrangement as defined by claim 1 wherein ejection blades are attached at the end of the body opposite from the first end.

3. A chopper arrangement as defined by claim 2 wherein the ejection blades adjoin the ejection duct.

4. A chopper arrangement as defined by claim 3 wherein the ejector blades rotate at a different rotational speed than the body.

5. A chopped arrangement as defined by claim 4 wherein a gearbox is operationally positioned between the body and blades.

6. A chopper arrangement as defined by claim 4 wherein the ejector blades are provided with an outside edge, the outside edge being provided with at least one knife that interacts with a shear bar that is fastened to the housing.

7. A chopper arrangement as defined by claim 4 wherein the ejector blades generate airflow in the axial direction.

* * * * *